Patented May 1, 1945

2,375,140

UNITED STATES PATENT OFFICE 2,375,140

EMULSION POLYMERIZATION OF BUTADIENE-1,3 HYDROCARBONS

Waldo L. Semon, Silver Lake, Ohio, assignor to The B. F. Goodrich Company, New York, N. Y., a corporation of New York No Drawing. Application July 21, 1942, Serial No. 451,758

12 Claims. (Cl. 260—32)

This invention relates to the emulsion polymerization of butadiene-1,3 hydrocarbons and particularly to an improved class of emulsifying agents for use in such polymerizations.

It is known that synthetic rubber latices which may be coagulated to yield synthetic rubber may be prepared by the polymerization in aqueous emulsion of butadiene-1,3 hydrocarbons either alone or in admixture with each other or with other polymerizable compounds. In this process the formation of the aqueous emulsion containing the polymerizable materials, or monomers, necessitates the use of an emulsifying agent and, for this purpose, water soluble salts of fatty acids, or soaps, salts of sulfonated aliphatic compounds, salts of alkylated naphthalene sulfonic acids and salts of high molecular weight organic bases have heretofore been used.

Such emulsifying agents, however, have not been entirely suitable especially in instances where it is desired to produce concentrated synthetic latices which contain a relatively large proportion, say more than 30% by weight, of synthetic rubber and in instances where it is desirable to employ the latex itself in the production of synthetic rubber articles in the same manner that natural rubber latex is used. The production of concentrated latices using the known emulsifying agents is not commercially feasible because of the fact that relatively large amounts of emulsifying agent, about 5 to 15% of the weight of the materials polymerized, and relatively large amounts of water, about 200 to 500% of the weight of the materials polymerized, are necessary in order to form an emulsion which will remain fluid throughout the polymerization and will enable the polymerization to be completed in a convenient interval of time, say less than about 100 hours. Furthermore, the latices obtained using either relatively large or small concentrations of such known emulsifying agents are not suitable for use in the same manner as natural latex, for the deposition of thin films of rubber for instance, because of the deleterious effect of the emulsifying agent on the properties of the films when the concentration of the emulsifying agent is relatively high, or because of the tendency of the latex to coagulate upon the addition of compounding ingredients or even upon mechanical agitation when the concentration of the emulsifying agent is relatively low.

I have now discovered that the above-mentioned disadvantages attending the use of known emulsifying agents may substantially be eliminated and that emulsion polymerizations of butadiene-1,3 hydrocarbons may be effected rapidly to produce synthetic latices which may contain even as high as 50% by weight of synthetic rubber and which may be used in the same manner as natural latex for the deposition of films and the like, by employing as the emulsifying agent a water soluble salt of an aliphatic-substituted benzene sulfonic acid wherein the aliphatic portion of the compound contains from 3 to 18 carbon atoms.

The preferred emulsifying agents of this class are alkali metal salts of alkylated benzene sulfonic acids wherein the total number of carbon atoms in the alkyl portion of the compound is from 3 to 18, and still more preferably from 6 to 16, suitable examples of such compounds including alkali metal mono-alkyl benezene sulfonates wherein the alkyl group is propyl, isopropyl, isobutyl, amyl, hexyl, octyl, nonyl, decyl, undecyl, lauryl, tridecyl, myristyl, palmityl or the like, preferably an alkyl group containing from 6 to 16 carbon atoms; alkali metal dialkyl benzene sulfonates wherein the alkyl group contains from 3 to 8 carbon atoms and the total number of carbons in the alkyl groups is from 6 to 16; alkali metal trialkyl benzene sulfonates wherein each alkyl group contains from 3 to 5 carbon atoms and the total number of carbon atoms in the alkyl groups is from 9 to 15; and other similar alkyl substituted benzene sulfonates. However, other water soluble salts of aliphatic-substituted benzene sulfonic acids wherein one or more other aliphatic substituents such as substituted alkyl, alkylene, alkoxy, acyl, alkylamino, dialkylamino, alkylamide and other aliphatic groups are attached to the benezene ring and the total number of carbon atoms in the aliphatic portion of the compound is from 3 to 18, may also be employed. Moreover, either only one or more than one sulfonic acid or sulfonate radical may be attached to the benzene ring and the benzene ring may also be substituted by hydroxyl or carboxyl groups or other types of substituents but the latter are preferably not present.

These emulsifying agents may be prepared by known methods. For example, alkali metal salts of alkylated benzene sulfonic acids may be prepared by the sulfonation of alkylated benzenes which may be prepared from alkyl halides and benzene by the Friedel-Crafts reaction. Other aliphatic substituted benzene sulfonates may similarly be made by the sulfonation of the appropriate benzene derivative or, in case the aliphatic substituent is an alkyl or dialkylamino group, by the reaction of sulfanilic acid with alkyl halides.

Many of these aliphatic substituted benzene sulfonates are commercially available, for example, alkali metal salts of alkylated benzene sulfonic acids, or mixtures of these, are available under the trade names "Santomerse D" and "Naccanol." Such commercially available materials because of their low cost and availability are often preferred in the practice of this invention.

In the present invention the above-described water soluble salts of aliphatic substituted benzene sulfonic acids are employed as emulsifying agents in the polymerization in aqueous emulsion of any of the butadiene-1,3 hydrocarbons including butadiene-1,3 itself, commonly termed butadiene, as well as its hydrocarbon homologs such as isoprene, 2,3-dimethyl butadiene, piperylene and the like. Mixtures of such hydrocarbons with one another or with one or more other monomers which are copolymerizable therewith in aqueous emulsion to form linear copolymers may also be used. Such other monomers are, in general, readily polymerizable compounds containing an olefinic group,

which is usually activated because of its presence at the end of a chain as in a vinyl,

or vinylidene

group and/or because it is present in a conjugated system as in the structures

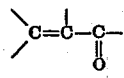

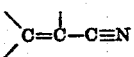

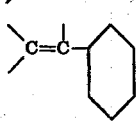

etc. Examples of suitable monomers which are copolymerizable in aqueous emulsion with butadiene-1,3 hydrocarbons include aryl olefins such as styrene, p-chloro-styrene, p-methoxy-styrene, vinyl naphthalene and the like; acrylic and substituted acrylic acids and their esters, nitriles and amides such as acrylic acid, methyl acrylate, ethyl acrylate, methyl alpha-chloro acrylate, methyl methacrylate, ethyl methacrylate, acrylonitrile, ethacrylonitrile, methacrylamide and the like; methyl vinyl ether, methyl isopropenyl ketone, vinylidene chloride, vinyl furane, vinyl acetate, diethyl fumarate and the like. It is preferable, in this invention, that monomer mixtures contain a larger amount of butadiene-1,3 hydrocarbons than of other monomers, especially if the latex obtained by the emulsion polymerization is to be used as a substitute for natural rubber latex, but the invention is applicable to any mixture of butadiene-1,3 hydrocarbons and other monomers copolymerizable therewith in aqueous emulsion regardless of the proportions of the various constituents of the mixture.

Many methods and procedures for effecting the polymerization in aqueous emulsion of butadiene-1,3 hydrocarbons or mixtures of monomers containing the same are well known to the art and in general, these same methods and procedures may be employed when the emulsifying agents of this invention are utilized. Thus the polymerization may be carried out by agitating an emulsion containing the polymerizable material, water and emulsifying agent together, if desired, with various other substances which may be present, at a temperature of about 20 to 80° C. for a time sufficient for polymerization to occur. Obviously the time required for the polymerization will depend upon the nature of the particular emulsion. The polymerization of the emulsified monomers may be arrested, as by the addition to the emulsion of a polymerization inhibitor, after from about 70 to 90 percent of the monomers have polymerized or it may be allowed to continue until substantially all of the monomeric material has been converted into polymer.

Substances which are preferably present in the emulsion during the polymerization, in addition to the monomers, water and emulsifying agent, include polymerization initiators which are usually necessary to effect the polymerization; polymerization catalysts or activators which are added primarily to speed up the process; polymerization modifiers which are added to increase the plasticity and solubility of the synthetic rubber product; and water soluble salts which are added to prevent the formation of gels during the polymerization or to bring the emulsion to the pH most favorable for the action of the initiator. Exemplary initiators are hydrogen peroxide, potassium persulfate, sodium perborate, potassium percarbonate, sodium periodate and other percompounds as well as diazoaminobenzene, dipotassium diazomethane disulfonate and the like. Exemplary catalysts or activators include simple and complex, water soluble, heavy metal salts such as ferric sulfate, cobaltous chloride and sodium cobaltinitrite; complex compounds consisting of heavy metal salts associated in complex formation with pyrophosphates, organic acids, certain sulfur-compounds such as beta-mercapto ethanol, sugars, sterols and the like; and other non-heavy metal containing catalysts such as certain vitamins, dicyan-diamidine-di-sulfate, and thiobarbituric acid. Exemplary modifiers include sulfur-containing organic compounds such as dialkyl dixanthogens, diaryl mono- and di-sulfides, tetra alkyl thiuram mono- and disulfides, higher aliphatic mercaptans, and mercaptothiazoles. Salts which are added to prevent gel formation and/or to regulate the pH of the emulsion include water soluble inorganic salts such as alkali metal chlorides, sulfates, phosphates, carbonates and borates and water soluble salts of organic acids such as alkali metal citrates, tartrates and oxalates. Obviously, many materials, pyrophosphates, persulfates, and carbonates, for examples, may serve dual or even triple functions.

The preferred methods of practicing the invention and the improved results obtained when the emulsifying agents of this invention are employed in the polymerization in aqueous emulsion of butadiene-1,3 hydrocarbons may best be understood from the following specific examples which are intended to illustrate rather than limit the invention. The parts are by weight.

*Example I*

An emulsion containing 55 parts of butadiene and 45 parts of acrylonitrile as the polymerizable materials, 5 parts of sodium diisobutyl benzene sulfonate as the emulsifying agent, 250 parts of water, 0.35 part of hydrogen peroxide as a polymerization initiator, 0.60 part of di-isopropyl dixanthogen as a polymerization modifier, a catalyst mixture consisting of 0.60 part of sodium pyrophosphate, 0.01 part of ferric ammonium sulfate, 0.001 part of cobaltous chloride, and a sufficient amount of a phosphate buffer to impart to the emulsion a pH of about 8–9, is agitated at 30° C. The polymerization requires 24 hours for completion and a fluid light colored latex is obtained as the product. The resulting latex is stabilized by adding thereto an emulsion of an alkylated diarylamine and a portion of the latex is then spread on a glass plate and allowed to dry. The films deposited are transparent and possess good strength and elongation when either wet or dry. When the example is repeated except that an equal quantity of di-isobutyl naphthalene sulfonate is employed as the emulsifying agent, the polymerization requires over 100 hours for completion and the films deposited from the latex were cracked and opaque in appearance and were very weak both when wet or dry. Similar weak unsatisfactory films were obtained when the example was repeated using fatty acid soaps, and sodium alkyl sulfates as the emulsifying agent. The latex prepared with the sodium di-isobutyl benzene sulfonate as the emulsifying agent was also more suitable for dipping operations than the latex prepared with the other types of emulsifying agents.

*Example II*

An emulsion similar to the emulsion described in Example I except that 2.1 parts of sodium tridecyl benzene sulfonate is employed as the emulsifying agent and only 210 parts of water are used, is prepared and is polymerized by agitating at 30° C. for 34 hours. The resulting latex contains about 45% by weight of a butadiene-acrylonitrile copolymer type synthetic rubber yet it is stable and does not coagulate on the addition of compounding ingredients such as zinc oxide. This latex may be used to deposit strong tough films or in dipping operations. Other latices prepared using equal amounts of soaps, hymolal sulfates and even alkylated naphthalene sulfonates as the emulsing agent are coagulated easily upon the addition of zinc oxide and in some cases even by mechanical agitation. Moreover, a much longer reaction time is necessary for the polymerization of similar emulsions prepared with these emulsifying agents than is required in this example.

*Example III*

A mixture of 90 parts of butadiene, 20 parts of piperylene and 90 parts of acrylonitrile is agitated at 30° C. in the presence of 1.8 parts of sodium lauryl benzene sulfonate dissolved in 180 parts of water as the emulsifying agent, 0.52 part of hydrogen peroxide, 1.2 parts of di-isopropyl dixanthogen and a small amount of a catalyst of the type employed in the previous examples. The latex obtained is quite stable and may be used to deposit films which exhibit excellent strength, elongation and elasticity.

*Example IV*

A mixture of 45 parts of butadiene, 15 parts of styrene and 1.5 parts of acrylonitrile are emulsified with 54 parts of an aqueous solution containing 2.7 parts (4.5% on the polymerizable materials) of Naccanol NRSF, a commercially available emulsifying agent consisting of sodium salts of alkyl benzene sulfonic acids wherein the average chain length of the alkyl group is 12–14 carbon atoms. To the emulsion so obtained there is then added 0.27 part of di-isopropyl dixanthogen, 0.40 part of potassium persulfate, 0.30 part of $Na_4P_2O_7$, 1.0 part of $Na_2HPO_4$, .015 part of $Fe_2(SO_4)_3.7H_2O$ and .0015 parts of $CoCl_2.6H_2O$ and the emulsion is agitated at 40° C. for 41½ hours whereupon polymerization is complete. Although the latex contains over 50% by weight of synthetic rubber it is fluid and quite stable and may be used to deposit excellent films, or in the manufacture of dipped goods or it may be coagulated to yield a high quality synthetic rubber. Similar results are obtained when the example is repeated using sodium nonyl benzene sulfonate, sodium myristyl benzene sulfonate, sodium di-isopropyl benzene sulfonate and sodium palmityl benzene sulfonate as the emulsifying agent but another similar example using di-isopropyl naphthalene sulfonate required over 100 hours for polymerization and yielded an inferior latex.

*Example V*

A mixture of 111 parts by weight of butadiene, 40 parts of styrene and 10.2 parts of alpha-methacrylamide is agitated until polymerization is complete at 40° C. in the presence of 210 parts of an aqueous solution containing 3.2 parts of sodium tridecyl benzene sulfonate as the emulsifying agent, 0.35 part of hydrogen peroxide as an initiator, 0.72 part of di-isopropyl dixanthogen as a modifier and a small amount of a catalyst of the type used in the previous examples. The resulting latex is unusually stable and resists coagulation by mechanical means. The films obtained by drying the latex are unusually strong and tough.

As illustrated in the foregoing examples, the amount of the emulsifying agent of this invention which may be used in forming the emulsion, and still effect a rapid polymerization, is somewhat smaller than may be employed with known emulsifying agents. However, larger amounts of emulsifying agent may also be employed, if desired, without seriously affecting the properties of the films deposited from the latices. In general from about 0.5 to 5% of emulsifying agent based on the weight of the polymerizable materials gives excellent results, although larger or even smaller amounts may be employed. For this amount of emulsifying agent, amounts of water as small or even smaller than the amount of polymerizable materials may be used to prepare fluid emulsions, and consequently, it is possible to prepare latices containing from 30 to 50% or even higher of synthetic rubber when the emulsifying agents of this invention are employed. Obviously, this permits the production of a larger quantity of synthetic rubber in a given amount of equipment than has heretofore been possible. However, if desired, more dilute latices may also be prepared using the method of this invention.

The synthetic rubber latices prepared by the method of this invention may be coagulated by the ordinary methods, such as by addition of acids or salts, to yield massive synthetic rubber which may then be used in the preparation of numerous articles, or the latices may be coagulated by electronic deposition processes employing electric currents or electrolytes in much the same manner as natural latex. Thus, these latices may be used in the manufacture of dipped goods etc. which have heretofore been made only from natural rubber latex.

Many modifications and variations which will be apparent to those skilled in the art are within the spirit and scope of the invention as defined in the appended claims.

I claim:

1. In a process of polymerizing a butadiene-1,3 hydrocarbon in an aqueous emulsion containing an emulsifying agent, the step which comprises using as the emulsifying agent a water soluble salt of an aliphatic-substituted benzene sulfonic acid wherein the aliphatic portion of the compound contains from 3 to 18 carbon atoms.

2. In a process of polymerizing a mixture of unsaturated organic compounds which are copolymerizable in aqueous emulsion, at least one of which is a butadiene-1,3 hydrocarbon, in an aqueous emulsion containing an emulsifying agent, the step which comprises using as the emulsifying agent an alkali metal salt of an alkylated benzene sulfonic acid wherein the alkyl portion of the compound contains from 3 to 18 carbon atoms.

3. In a process of polymerizing a mixture of a butadiene-1,3 hydrocarbon and at least one other compound containing an olefinic group, in an aqueous emulsion containing an emulsifying agent, the step which comprises using as the emulsifying agent an alkali metal salt of a mono-alkyl substituted benzene sulfonic acid wherein the alkyl group contains from 6 to 16 carbon atoms.

4. In a process of polymerizing a mixture of a butadiene-1,3 hydrocarbon and at least one other organic compound containing an olefinic group, in an aqueous emulsion containing an emulsifying agent, the step which comprises using as the emulsifying agent an alkali metal salt of a di-alkyl substituted benzene sulfonic acid wherein the total number of carbon atoms in the alkyl groups is from 6 to 16.

5. In a process of polymerizing a butadiene-1,3 hydrocarbon in an aqueous emulsion containing an emulsifying agent, the step which comprises using as the emulsifying agent an alkali metal salt of a mono-alkyl substituted benzene sulfonic acid wherein the alkyl group contains from 6 to 16 carbon atoms.

6. In a process of polymerizing a mixture including butadiene and acrylonitrile in an aqueous emulsion containing an emulsifying agent, the step which comprises using as the emulsifying agent an alkali metal salt of a di-alkyl substituted benzene sulfonic acid wherein the total number of carbon atoms in the alkyl groups is from 6 to 16.

7. In a process of polymerizing a mixture of butadiene and acrylonitrile in an aqueous emulsion containing an emulsifying agent, the step which comprises using as the emulsifying agent sodium di-isobutyl benzene sulfonate.

8. In a process of polymerizing a butadiene-1,3 hydrocarbon in an aqueous emulsion containing an emulsifying agent, the step which comprises using as the emulsifying agent sodium lauryl benzene sulfonate.

9. In a process of polymerizing a mixture of butadiene and styrene in an aqueous emulsion containing an emulsifying agent, the step which comprises using as the emulsifying agent sodium lauryl benzene sulfonate.

10. A synthetic rubber latex prepared by the polymerization of a butadiene-1,3 hydrocarbon in an aqueous emulsion containing a water soluble salt of an aliphatic-substituted benzene sulfonic acid wherein the aliphatic portion of the compound contains from 3 to 18 carbon atoms.

11. A synthetic rubber latex prepared by the polymerization of a mixture of a butadiene-1,3 hydrocarbon and at least one other compound containing an olefinic group, in an aqueous emulsion containing an alkali metal salt of a mono-alkyl substituted benzene sulfonic acid wherein the alkyl group contains from 6 to 16 carbon atoms.

12. A synthetic rubber latex prepared by the polymerization of a mixture of a butadiene-1,3 hydrocarbon and at least one other compound containing an olefinic group, in an aqueous emulsion containing an alkali metal salt of a di-alkyl substituted benzene sulfonic acid wherein the total number of carbon atoms in the alkyl groups is from 6 to 16.

WALDO L. SEMON.